United States Patent [19]

Richards et al.

[11] Patent Number: 5,355,169

[45] Date of Patent: Oct. 11, 1994

[54] METHOD FOR PROCESSING A DIGITAL VIDEO SIGNAL HAVING PORTIONS ACQUIRED WITH DIFFERENT ACQUISITION CHARACTERISTICS

[75] Inventors: John W. Richards; Martin R. Dorricott, both of Hampshire; Morgan W. A. David, Surrey; Stephen M. Keating, Berkshire, all of Great Britain

[73] Assignee: Sony United Kingdom Limited, Middlesex, United Kingdom

[21] Appl. No.: 31,109

[22] Filed: Mar. 12, 1993

[30] Foreign Application Priority Data

Mar. 18, 1992 [GB] United Kingdom ............... 9205921

[51] Int. Cl.⁵ .............................................. H04N 7/01
[52] U.S. Cl. ..................................... 348/459; 348/443
[58] Field of Search ................... 358/140, 11, 12, 141, 358/160, 180, 138; 348/443, 445, 458, 459, 441; H04N 7/07

[56] References Cited

U.S. PATENT DOCUMENTS

| | | | |
|---|---|---|---|
| 3,457,369 | 7/1969 | Davis et al. | 358/140 |
| 4,862,266 | 8/1989 | Gillard | 358/140 |
| 5,187,575 | 2/1993 | Lim | 358/140 |

FOREIGN PATENT DOCUMENTS

| | | | |
|---|---|---|---|
| 2231228 | 7/1990 | European Pat. Off. | H04N 7/01 |
| 0514012 | 11/1992 | European Pat. Off. | H04N 7/01 |
| 85976 | 4/1991 | Japan | H04N 7/01 |
| WO92/09172 | 5/1992 | PCT Int'l Appl. | H04N 7/08 |
| 2240232 | 7/1991 | United Kingdom . | |

Primary Examiner—James J. Groody
Assistant Examiner—Glenton B. Burgess
Attorney, Agent, or Firm—William S. Frommer; Alvin Sinderbrand

[57] ABSTRACT

An input digital video signal representing a series of input frames with at least some of the input frames each having a first picture portion having a first acquisition characteristic (such as 60 Hz, 2:1) and a second picture portion having a second acquisition characteristic (such as 30 Hz, 1:1) is processed to produce an output video signal representing a series of output frames having generally the same acquisition characteristic (such as 24 Hz, 1:1). The method comprises the steps of distinguishing between the first and second picture portions in the input frames (for example by determining the difference between input fields ($a_1$, $a_2$; $a_3$, $a_4$; ...) of a pair, or by detecting a key signal accompanying the input video signal) and processing the first and second picture portions differently to produce the output frames.

10 Claims, 11 Drawing Sheets

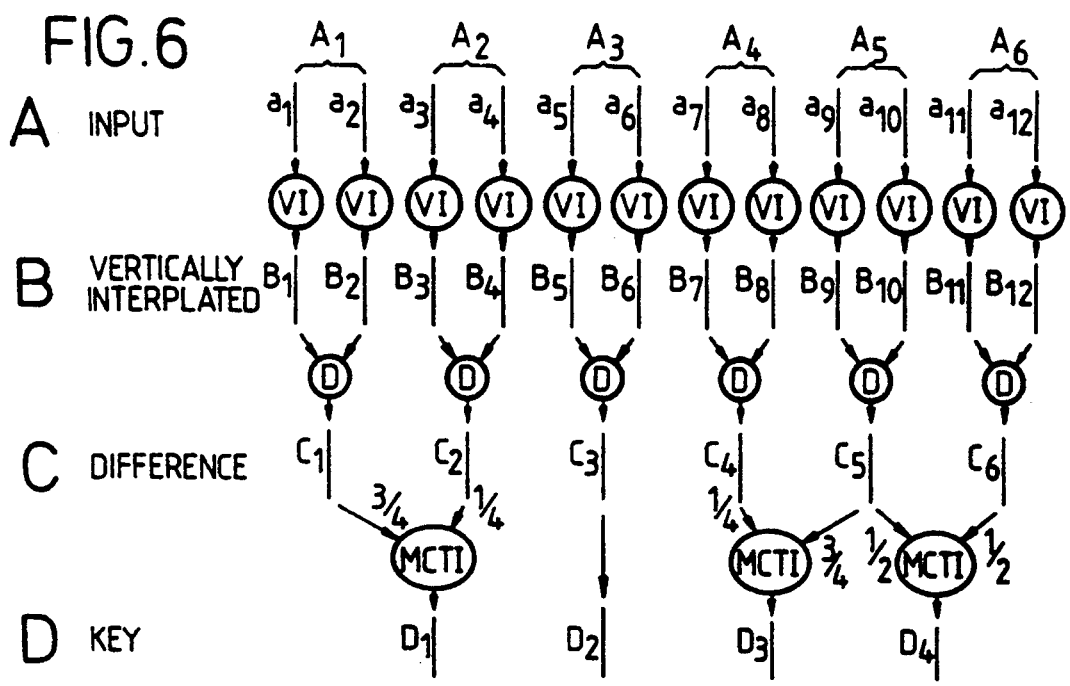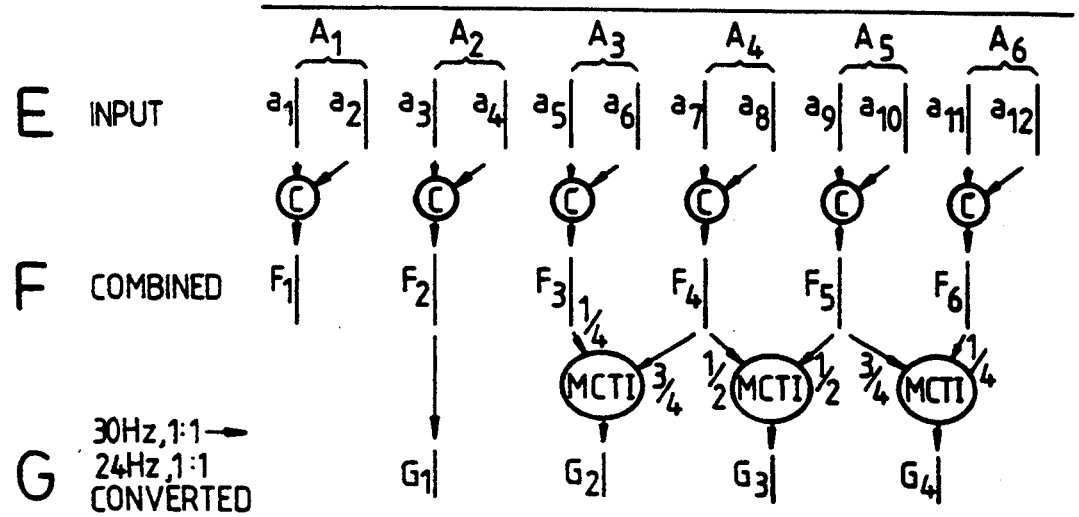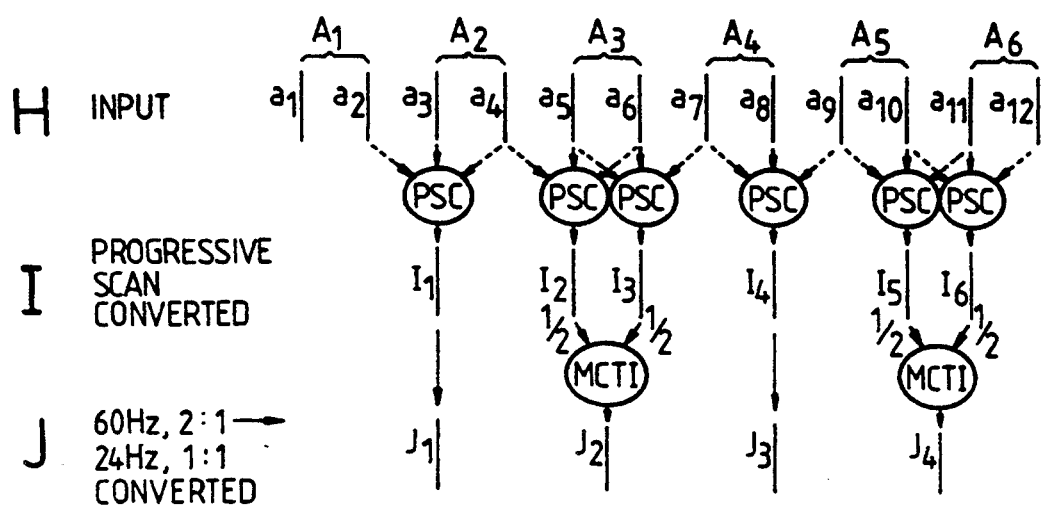
FIG.6

METHOD FOR PROCESSING A DIGITAL VIDEO SIGNAL HAVING PORTIONS ACQUIRED WITH DIFFERENT ACQUISITION CHARACTERISTICS

BACKGROUND OF THE INVENTION

1. Field of the Invention

This invention relates to digital video signal processing and in particular with processing an input digital video signal representing a series of input frames to produce an output digital video signal representing a series of output frames. The invention is more particularly concerned with the case where at least some of the input frames each have a first picture portion acquired with a first acquisition characteristic (such as, for example, 60 fields/second, 2:1 interlace) and a second picture portion acquired with a second acquisition characteristic (such as, for example, 30 frames/second, 1:1 progressive scan). This invention is more particularly, but not exclusively, concerned with the case where the output signal simulates frames acquired with a different acquisition characteristic (such as, for example, 24 frames/second, 1:1 progressive scan), but is also applicable in the case where the output signal is to simulate frames wholly acquired with the acquisition characteristic of one of the picture portions of the input signal (such as, for example, 60 fields/second, 2:1 interlace).

2. Description of the Prior Art

Patent Application GB 2231228 A describes a method of converting a digital video signal in 60 fields/second, 2:1 interlace, format so as to simulate acquisition at 24 frames/second, 1:1 progressive scan format, In the simplest form of that method, for a series of ten input fields, progressive scan format frames are produced temporally aligned with the first, third, fourth, sixth, eighth and ninth of the ten input fields each either by inter-field interpolation of the respective input field with the preceding and succeeding fields, and/or by intra-field interpolation of the respective input field, depending upon the amount of motion detected in the input picture. Of a series of four corresponding output frames, the first and Fourth progressive scan converted frames can be directly used as the first and third output frames. On the other hand, the second and Fourth output frames are produced by motion compensated temporal interpolation half-way between the second and third progressive scan converted frames, and half-way between the fifth and sixth progressive scan converted frames, respectively. Motion compensated temporal interpolation involves producing, for each pixel in the output frame, a motion vector indicative of the motion of the object which that pixel represents between ,the respective pair of progressive scan converted frames. In the case of half-way interpolation, the value of each pixel in the output frame is then determined by averaging the values of the pixels located at positions in the respective pair of progressive scan converted frames offset by one-half of the motion vector one way and the other, respectively, from the position of the pixel in the output frame.

Patent Application GB 2249907 A describes a number of developments to the method described in GB 2231228 A, for example for converting 30 frames/second, 1:1 progressive scan format material by motion compensated temporal interpolation so as to simulate acquisition at 24 frames/second, 1:1 progressive scan format.

A prerequisite for satisfactory conversion using the method of GB 2231228 A and the various methods of GB 2249907 A is that the input signal has a single (actual or simulated) temporal acquisition characteristic. However, it is perceived that there is a need for this general type of conversion method which produces satisfactory results in the case where the input signal is a composite having two different temporal acquisition characteristics.

OBJECT AND SUMMARY OF THE INVENTION

It is an object of the present invention to provide a method and apparatus which produces satisfactory conversion results when the input signal is a composite having two different acquisition characteristics.

For example, an object of one aspect of the invention is to convert an input video signal which is a composite of material acquired with a 60 fields/second, 2:1 interlace, video camera and material acquired from a computer graphics system in 30 frames/second, 1:1 progressive scan format (but included in the 60 fields/second, 2:1 interlace, signal with the fields of each pair temporally co-sited) to produce an output video signal which simulates acquisition at 24 frames/second, 1:1 progressive scan format, so that the output signal can be used, for example, with an electron beam recorder to produce a 24 frames/second film. This example involves a change of frame rate. An object of another aspect of the invention is to convert an input video signal crudely composited as above to produce an output signal which simulates acquisition of the whole picture in 60 fields/second, 2:1 interlace, format. This latter example does not involve a change of frame rate.

In the light of the above, a first aspect of the present invention is more particularly concerned with providing a method of processing an input digital video signal representing a series of input frames to produce an output video signal representing a series of output frames, at least some of the input frames each having a first picture portion having a first acquisition characteristic and a second picture portion having a second acquisition characteristic.

In order to meet the needs mentioned above, the method of this first aspect of the present invention includes by the steps of distinguishing between the first and second picture portions in the input frames; and processing the first and second picture portions differently to produce the output frames so that the output frames simulate acquisition of the first and second picture portions with generally the same acquisition characteristic.

In one example of the method in which the first picture portions are acquired as progressive scan frames at a first frame rate (e.g. 30 Hz, 1:1), and the second picture portions are acquired as interlaced fields at the first frame rate (e.g. 60 Hz, 2:1), the distinguishing step may comprise detecting picture motion between fields of the same input frame; and the processing step may comprise producing an output frame: generally by intra-field interpolation of a respective input field in areas of relatively large detected motion; and generally by combination of respective input fields in areas of no or relatively small detected motion. In this case, the processing step preferably includes combining, for each pixel, the corresponding intra-field interpolated pixel value with the corresponding field-combined pixel value in proportion to a degree of detected motion of that pixel. Additionally, this example of the method may further comprise the step of further processing the output frames using motion compensated temporal interpolation to simulate acquisition with a different acquisition characteristic (e.g. 24 Hz, 1:1).

This relatively straightforward first example of the invention involves decimation of the temporal sampling rate, and thus there is a loss of picture data. In order to avoid this, in a second example of the method of the invention in which the first picture portions are acquired as progressive scan frames at a first frame Fate (e.g. 30 Hz, 1:1), the second picture portions are acquired as pairs of interlaced fields at the first frame rate (e.g. 60 Hz, 2:1), and the output signal simulates acquisition at the first frame rate, the distinguishing step may include forming a first series of difference frames corresponding to the difference between the fields of each input frame; and the processing step may include: forming a series of progressive scan picture frames at least by intra-field interpolation of one field of each frame so that the interpolated picture frames are temporally co-sited with the first picture portions of respective ones of the input frames; producing a second series of difference frames by motion compensated temporal interpolation of the first series of difference frames so that the second difference frames are temporally co-sited with respect to the first picture portions of respective ones of the input frames; and matting the input frames and the interpolated picture frames using the second difference frames as a key signal.

In a modification of this second example of the invention in which the output video signal simulates acquisition with a third different acquisition characteristic (e.g. 24 Hz, 1:1), the distinguishing step may include forming a first series of difference frames corresponding to the difference between the fields of each input frame; and the processing step comprises the steps of: forming a first series of intermediate frames by a motion compensated temporal interpolation process for converting the first picture areas to simulate acquisition with the third acquisition characteristic; forming a second series of intermediate frames by a motion compensated temporal interpolation process for converting the second picture areas to simulate acquisition with the third acquisition characteristic, each second intermediate frame being temporally co-sited with a respective one of the first intermediate frames; forming a second series of difference frames by motion compensated temporal interpolation for converting the first difference frames to the third acquisition characteristic, each second difference frame being temporally co-sited with a respective one of the first intermediate frames; and matting the first and second intermediate frames using the second difference frames as a key signal.

This second example of the invention and the modification thereto involve the generation of difference frames from the source video. In many cases, the source video may have been post-produced using a key signal, and in a third example of the invention this key signal is utilised in the acquisition conversion process. More specifically, in the third example of the method of the invention in which the first picture portions are acquired as progressive scan frames at a first frame rate (e.g. 30 Hz, 1:1), the second picture portions are acquired as pairs of interlaced fields at the first frame rate (e.g. 60 Hz, 2:1), the input signal is accompanied by a series of key frames indicating the first and second picture portions, and the output video signal simulates acquisition with a third different acquisition characteristic (e.g. 24 Hz, 1:1), the distinguishing step may comprise detecting the key frames; and the processing step may include: forming a first series of intermediate frames by motion compensated temporal interpolation for converting the first picture areas to simulate acquisition with the third acquisition characteristic; forming a second series of intermediate frames by motion compensated temporal interpolation for converting the second picture areas to simulate acquisition with the third acquisition characteristic, each second intermediate frame being temporally co-sited with a respective one of the first intermediate frames; forming a second series of key frames by motion compensated temporal interpolation for converting the detected key frames to the third acquisition characteristic, each second key frame being temporally co-sited with a respective one of the first intermediate frames; and matting the first and second intermediate frames using the second key frames as a key signal.

In a further example of the invention, the processing step includes: processing the input frames to simulate a first conversion from the first acquisition characteristic to the output acquisition characteristic using motion compensated temporal interpolation in which motion vectors are developed for pixels in the picture (for example as described in patent application GB 2231228 A or GB 2249907 A); and developing a measure of merit for each motion vector; and the distinguishing step is performed in dependence upon the measures of merit. In this case, the processing step may further include: processing the input frames to simulate a second conversion from the second acquisition characteristic to the output acquisition characteristic using motion compensated temporal interpolation in which motion vectors are developed for pixels in the picture; and developing a measure of merit for each motion vector; and the distinguishing step may be performed in dependence upon a comparison of the measures of merit of the first and second conversions. The distinguishing step may also be performed in dependence upon a comparison of the motion vectors of the first and second conversions.

The present invention also provides apparatus adapted to perform the methods described above.

Other objects, features and advantages of the present invention will become apparent from the following description of preferred embodiments of the invention, given by way of non-limiting example and with reference to the accompanying drawings.

BRIEF DESCRIPTION OF THE DRAWINGS

FIG. 6 illustrates a second example of a method of video signal processing according to the invention;

DETAILED DESCRIPTION OF THE PREFERRED EMBODIMENTS

Figure 1:
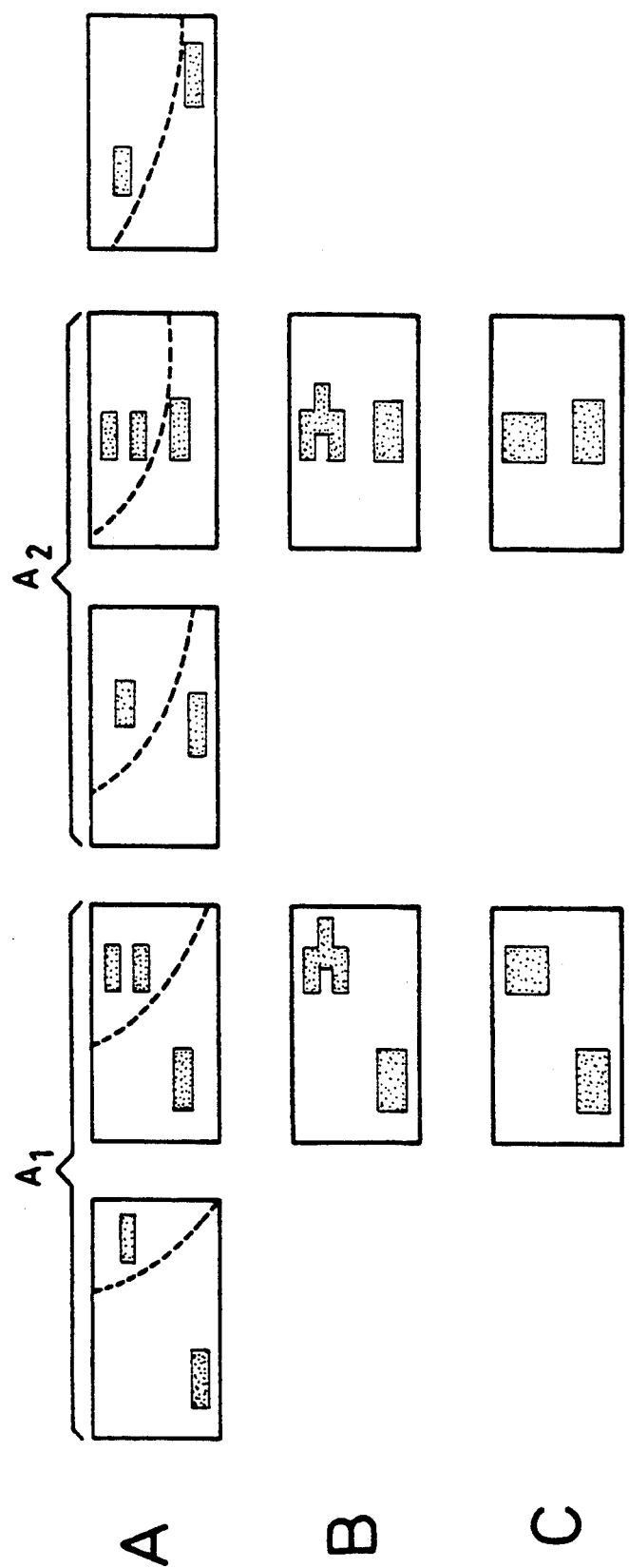
FIG. 1 illustrates a first example of a method of video signal processing according to the invention.

A first embodiment of the invention will now be described, with reference to FIGS. 1 to 4 of the drawings, for converting material acquired partly at 60 Hz, 2:1, and partly at 30 Hz, 1:1 to simulate acquisition at 24 Hz, 1:1, For simplicity, FIG. 1 shows frames having only nine active lines, and it should be noted that actual high-definition video has of the order of one thousand active lines. In order to convert the input 60 Hz, 2:1/30 Hz, 1:1 composite video signal to simulate 24 Hz, 1:1 acquisition, the temporal sampling rate of the input signal is decimated to the lowest common denominator of the acquisition rates of the two portions of the input signal, that is 30 Hz, 1:1 in this example.

The first row A of FIG. 1 shows a series of the input fields at 60 Hz, 2:1, representing a square towards the top of the picture moving to the left, a rectangle towards the bottom of the picture moving to the right, and a static background. The portion of the picture to the left of the dotted line (and thus including the rectangle) was acquired at 30 Hz 1:1 whereas the portion of the picture to the right of the dotted line (and thus including the square) was acquired at 60 Hz, 2:1. In order to decimate the picture to 30 Hz, 1:1 field pairs could be directly combined, as shown in row B of FIG. 1. If this were done, the background and 30 Hz, 1:1 acquired rectangle would be properly represented in the combined 30 Hz, 1:1 picture. However, the 60 Hz, 2:1, acquired rectangle would suffer from interlace smear, as shown in row B of FIG. 1. In order to reduce or eliminate this interlace smear problem, in areas of the picture where a large degree of motion is detected between fields of a pair (and thus only in the 60 Hz, 2:1, acquisition area), the picture is formed by intra-field interpolation of one of the fields of the pair. In such areas where some smaller motion is detected, the picture is formed by a combination of intra-field interpolation of one of the fields of the pair and a combination of the two fields of the pair. Furthermore, if no motion is detected, the whole of the combined frame is produced by combination of the two fields of the pair. Assuming that the square of FIG. 1 has a large degree of motion, then this process will produce output frames as shown in row C of FIG. 1, which are a better 30 Hz 1:1 representation of the picture than the frames of row B of FIG. 1.

Figure 2:
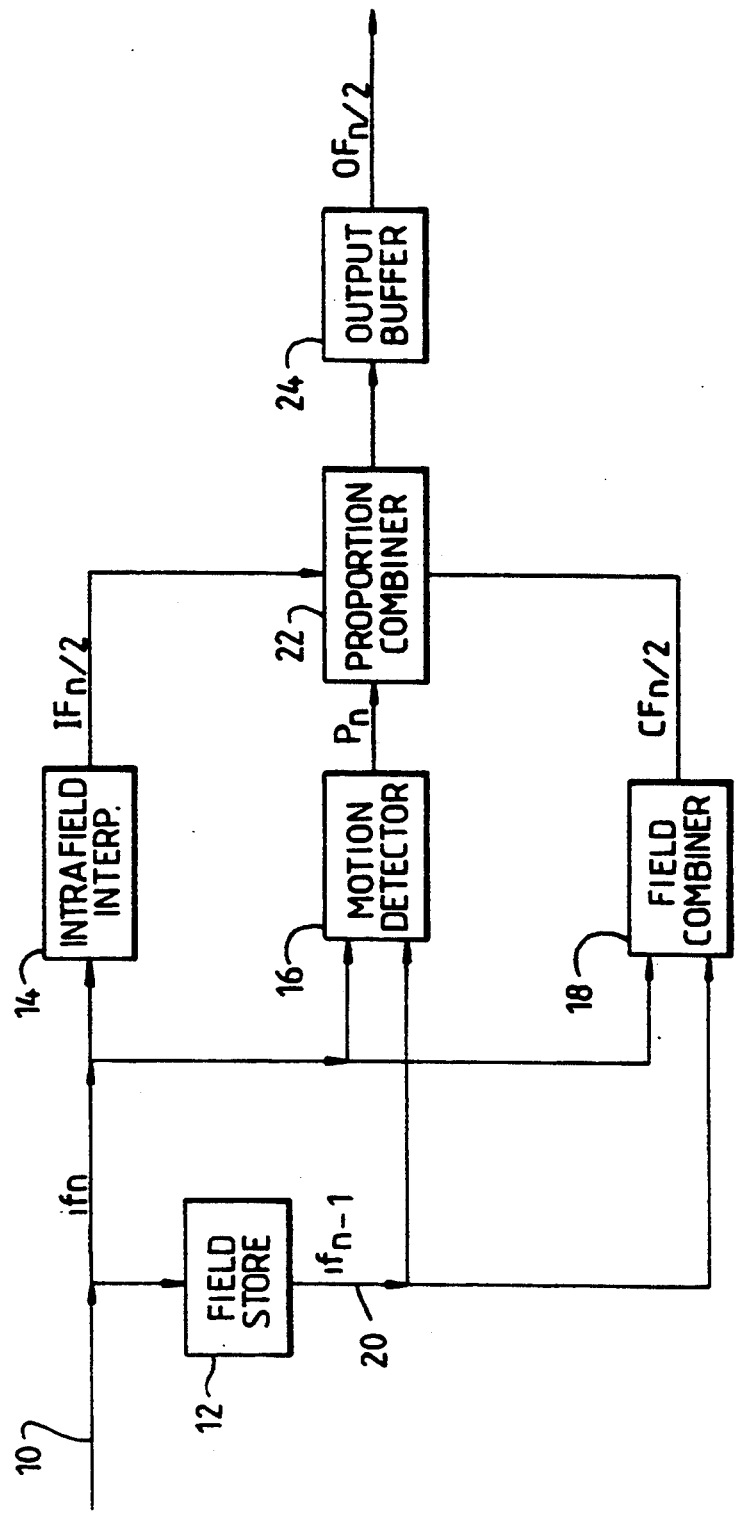
FIG. 2 is a block diagram of an apparatus for performing the method of FIG. 1.

An apparatus for performing the above-mentioned method will now be described with reference to FIG. 2. Input fields $if_n$ on line 10 are supplied to a field store 12, an intra-field interpolator 14, a motion detector 16 and a field combiner 18. The field store 12 produces a delay so that the fields $if_{n-1}$ output therefrom on line 20 are one field period behind the input fields $if_n$. The delayed fields $if_{n-1}$ are also supplied to the motion detector 16 and the field combiner. Intra-field interpolated frames are supplied by the interpolator 14 to a proportional combiner 22, and field combined frames are supplied by the field combiner 18 to the proportional combiner 22. For each pixel in a frame to be output, the motion detector 16 produces a motion estimate value $P_n$ ranging from, say, 0 to 255 indicative of the detected motion of the object which that pixel represents, and the proportional combiner 22 combines the values of the corresponding pixels produced by the intra-field interpolator 14 and the field combiner 18 in accordance with the value of the motion estimate value $P_n$ to produce the output pixel value, which is supplied to an output buffer 24, which then produces output frames $OF_{n/2}$ simulating acquisition at 30 Hz, 1:1.

The intra-field interpolator 14 produces a vertically interpolated frame $IF_{n/2}$ from every other input field $if_2$, $if_4$, $if_6$, .... In a simple form, for even lines, the value of a pixel at location (x,y) in the interpolated frame $IF_{n/2}$ is equal to the value of the pixel at the same location (x,y) in the corresponding even input field $if_n$. On the other hand, for odd lines, the value of a pixel at location (x,y) in the interpolated frame $IF_{n/2}$ is the average of the values of the pixels at the locations (x,y−1) and (x,y+1) above and below that location in the corresponding even input field $if_n$. That is to say:

for even lines (y even)

$$IF_{n/2}(x,y)=if_n(x,y);$$

and for odd lines (y odd)

$$IF_{n/2}(x,y)=\tfrac{1}{2}\{if_n(x,y-1)+if_n(x,y+)\}.$$

The field combiner 18 produces a combined frame $CF_{n/2}$ which is a direct combination of the respective pair of input fields $if_{n-1}$ and $if_n$, so that the even lines of the combined frame $CF_{n/2}$ are taken from the even input field $if_n$ and the odd lines are taken from the preceding odd input field $if_{n-1}$. That is to say:

for even lines (y even)

$$CF_{n/2}(x,y)=if_n(x,y);$$

and for odd lines (y odd)

$$CF_{n/2}(x,y)=if_{n-1}(x,y).$$

The proportional combiner 22 produces the value $OP_{n/2}(x,y)$ of each pixel of the output frame $OF_{n/2}$ by adding the proportion $P_n(x,y)$ of the value $IF_{n/2}(x,y)$ of the corresponding pixel of the intra-field interpolated frame with the complementary proportion $256-P_n(x,y)$ of the value $CF_{n/2}(x,y)$ of the field combined frame. That is to say:

$$OF_{n/2}=P_n(x,y)*IF_{n/2}(x,y)/256+(256-P_n(x,y))*CF_{n/2}(x,y)/256.$$

Figure 3:
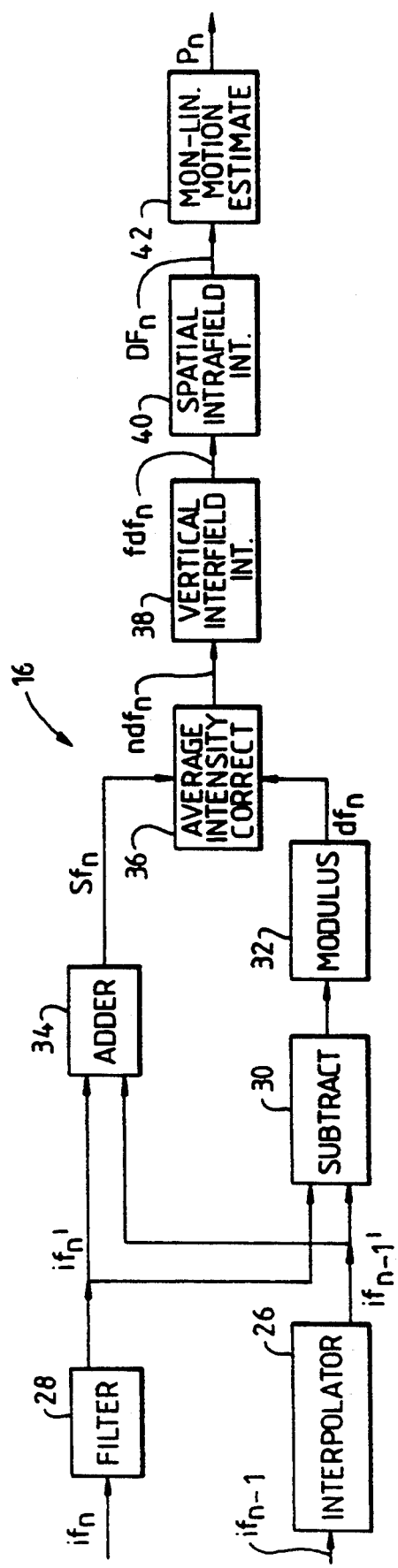
FIG. 3 is a block diagram showing more detail of a motion detector in the FIG. 2 apparatus.

The motion detector 26 will now be described in further detail with reference to FIG. 3. The operation of the motion detector is in some ways similar to the operation of the corresponding apparatus described in detail with reference to FIGS. 8 to 14 of patent application GB. 2231228 A. However, in this case, the inter-field difference signal of two fields of the same frame is used to indicate motion, rather than the difference signal between the two fields to either side of the field under consideration, as in the case of GB 2231228 A. Because the fields $if_{n-1}$, $if_n$ of a pair will be of different polarities (odd and even), an interpolator 26 is used on the odd field $if_{n-1}$ to produce an interpolated even polarity field $if_{n-1}'$, and a filter 28 is used on the even input field $if_n$ to match the response of the interpolator 26 and produce a filtered even polarity field $if_n'$. That is to say:

for y even $$if_{n-1}'(x,y) = \tfrac{1}{2}if_{n-1}(x,y-1) + \tfrac{1}{2}if_{n-1}(x,y+1)$$

and for y even $$if_n'(x,y) = \tfrac{1}{4}if_n(x,y-2) + \tfrac{1}{2}if_n(x,y) + \tfrac{1}{4}if_n(x,y+2).$$

A difference modulus field $df_n$ is produced from the interpolated and filtered fields $if_{n-1}'$, $if_n'$ by a subtracter 30 and a modulus operator 32 such that, for y even:

$$df_n(x,y) = |if_n'(x,y) - if_{n-1}'(x,y)|.$$

In order to normalise the difference modulus values, the sum $sf_n$ of the corresponding pixel values in the interpolated and filtered fields $if_{n-1}'$, $if_n'$ is produced by an adder 34 that is to say, for y even:

$$sf_n(x,y) = \tfrac{1}{2}if_{n-1}'(x,y) + \tfrac{1}{2}if_n'(x,y),$$

and an average intensity corrector 36 produces a field $ndf_n$ of normalised difference values, for example in accordance with the formula, for y even:

$$ndf_n(x,y) = df_n(x,y) * (1 - (sf_n(x,y)/(i_{max}+1)))$$

where $i_{max}$ is the maximum pixel value. The normalised difference field $ndf_n$ is then vertically filtered with the preceding and succeeding normalised difference fields $ndf_{n-2}$, $ndf_{n+2}$ for example using a three-tap filter 38 with coefficients of one-quarter, one-half and one-quarter, to produce a filtered difference field $fdf_n$. That is to say, for y even:

$$fdf_n(x,y) = \tfrac{1}{4}fdf_{n-2}(x,y-2) + \tfrac{1}{2}fdf_n(x,y) + \tfrac{1}{4}fdf_{n+2}(x,y+2)$$

for example, in order to reduce vertical alias problems, and in particular to minimise problems encountered with temporal alias. The first filtered difference field $fdf_n$ is then filtered by a spatial intra-field filter 40 in order to produce a difference frame $DF_n$, for example such that:

for y even $$DF_n(x,y) = \tfrac{1}{4}fdf_n(x,y-2) + \tfrac{1}{2}fdf_n(x,y) + \tfrac{1}{4}fdf_n(x,y+2);$$

and for y odd $$DF_n(x,y) = \tfrac{1}{2}fdf_n(x,y-1) + \tfrac{1}{2}fdf_n(x,y+1).$$

Figure 4:
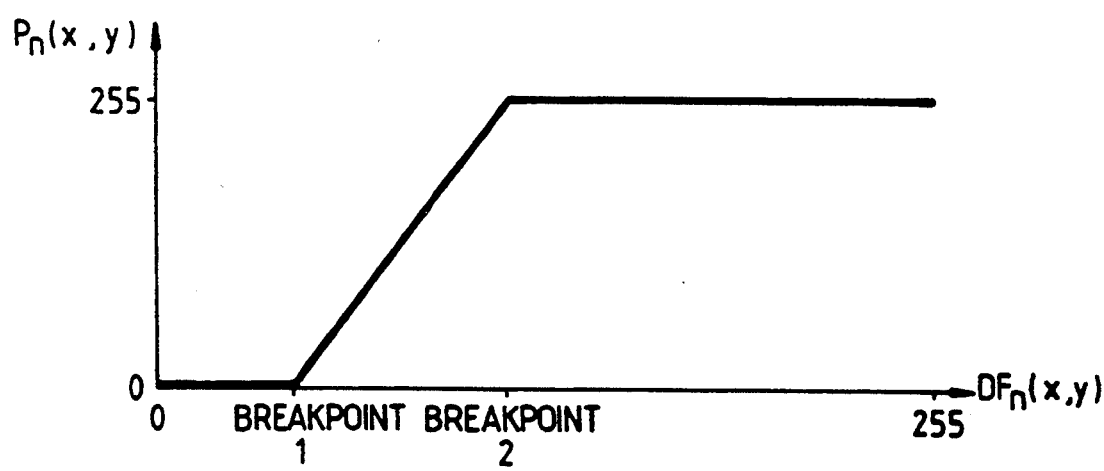
FIG. 4 shows an example of a characteristic of a non-linear motion estimate function of the FIG. 3 apparatus.

The spatial intra-field filter 40 may be arranged to filter more extensively vertically and also to filter horizontally in order to produce more smoothing of the difference values. Finally, in order to produce the frame of motion estimate values $P_n'$ the difference frame $DF_n$ is applied to a non-linear mapping function 42 which has a characteristic as shown in FIG. 4, so that: for a difference value $DF_n(x,y)$ from zero to a breakpoint 1 the motion estimate value $P_n(x,y)$ is zero; for a difference value $DF_n(x,y)$ greater than a breakpoint 2 the motion estimate value $P_n(x,y)$ is the maximum, say 255; and for difference values $DF_n(x,y)$ between breakpoint 1 and breakpoint 2, the motion estimate value $P_n(x,y)$ increases progressively.

Figure 5:
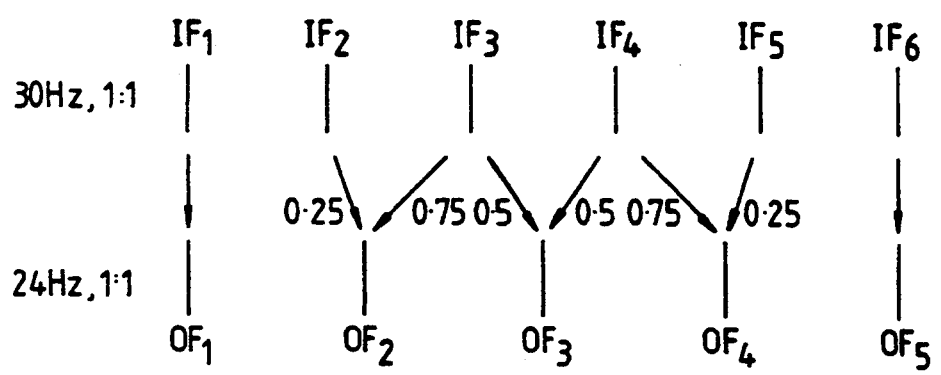
FIG. 5 illustrates the temporal relationship of input and output frames in 30 Hz, 1:1 to 24 Hz, 1:1 conversion.

The arrangement described with reference to FIGS. 1 to 4 converts material having portions acquired at 60 Hz, 2:1 and at 30 Hz, 1:1 so as to simulate acquisition as a whole at 30 Hz, 1:1. The converted material may be directly used, or alternatively it may be further converted using motion compensated temporal interpolation so as to simulate acquisition in a different format, such as 24 Hz, 1:1 as described in detail in patent application GB 2249907 A, particularly with reference to FIG. 70. Reference is directed to that earlier application for full detail. However, in summary, as shown in FIG. 5, row A represents a series of six 30 Hz, 1:1 input frames $IF_1$ to $IF_6$ and row B represents a series of five 24 Hz, 1:1 output frames $OF_1$ to $OF_5$. The first output frame $OF_1$ may be directly derived from the first input frame $IF_1$. However, the second output frame $OF_2$ is temporally interpolated with motion compensation one quarter of the way between the second and third input frames $IF_2$, $IF_3$; the third output frame $OF_3$ is temporally interpolated with motion compensation half-way between the third and fourth input frames $IF_3$, $IF_4$; and the fourth output frame $OF_4$ is temporally interpolated with motion compensation three-quarters of the way between the fourth and fifth input frames $IF_4$, $IF_5$. The process repeats for the next five input frames $IF_6$ to $IF_{10}$ and the next four output frames $OF_5$ to $OF_8$, and so on. By motion compensated temporal interpolation, it is meant that for each pixel in the output frame, a motion vector is generated indicative of the motion of the object which that pixel represents between the corresponding two input frames to be interpolated. The value of the output pixel is then derived from the values of the pixels in the two input frames offset from the location of the output pixel by amounts dependent on the motion vector and the temporal interpolation ratio. Thus, for example, for the second output frame $OF_2$, the output pixel value $OF_2(x,y)$ at location $(x,y)$ is given by:

$$OF_2(x,y) = 0.75*IF_2\{(x,y) - 0.25*M_2(x,y)\} + 0.25*IF_3\{(x,y) + 0.75M_2(x,y)\}$$

where $M_2(x,y)$ is the motion vector for a pixel at location $(x,y)$ in output frame $OF_2$, and $IF_2\{\}$ and $IF_3\{\}$ are the pixel values at the appropriate locations in input frames $IF_2$, $IF_3$.

The arrangement described above will not produce such good quality as can be achieved when converting material acquired wholly at 60 Hz, 2:1, to 24 Hz, 1:1 because the motion compensation operates on frames at twice the temporal spacing of 1/30s. Further arrangements, in accordance with the invention, which do not require decimation of the temporal sampling rate will now be described.

Referring to FIG. 6, row A represents a series of six frames $A_1$ to $A_6$ or twelve fields $a_1$ to $a_{12}$ of 60 Hz, 2:1 interlace material. Although in the form of 60 Hz, 2:1 interlace, some parts of the picture were acquired using a 60 Hz, 2:1 interlace video camera and thus the two fields of each frame are temporally offset, whereas other parts of the picture were acquired by 30 Hz, 1:1 computer graphics, and thus in these parts the two fields of each frame are temporally aligned. The input fields $a_1$ to $a_{12}$ are vertically interpolated to produce a series of twelve full frames $B_1$ to $B_{12}$ as represented by row B, and each pair of vertically interpolated frames derived from the same input frame are subtracted to produce a series of six difference frames $C_1$ to $C_6$, as represented by row C. The difference frames may be produced by simple subtraction, but more preferably the difference values are also normalised by an arrangement similar to elements 30 to 36 described above with reference to FIG. 3. The six difference frames are then 30 Hz, 1:1 to 24 Hz, 1:1 converted using motion compensated temporal interpolation to produce a series of four key frames $D_1$ to $D_4$, as represented by row D. Specifically, the first key frame $D_1$ is interpolated three-quarters of the way between the first and second difference frames $C_1$, $C_2$; the second key frame $D_2$ is directly derived from the third difference frame $C_3$; the third key frame $D_3$ is interpolated one-quarter of the way between the fourth and fifth difference frames $C_1$, $C_5$; and the fourth key frame $D_4$ is interpolated half-way between the fifth and sixth difference frames $C_5$, $C_6$.

Row E of FIG. 6 also shows the six input frames $A_1$ to $A_6$/twelve input fields $a_1$ to $a_{12}$. The two fields of each frame are directly combined to produce a series of six full frames $F_1$ to $F_6$ as represented by row F. The 30 Hz, 1:1 full frames are then 30 Hz, 1:1 to 24 Hz, 1:1 converted using motion compensated temporal interpolation to produce a series of four 30 Hz, 1:1 to 24 Hz, 1:1 converted frames $G_1$ to $G_4$ as represented by row G. The first converted frame $G_1$ is produced directly from the second 30 Hz frame $F_2$. The second converted frame $G_2$ is interpolated one-quarter of the way between the third and fourth 30 Hz frames $F_3$, $F_4$. The third converted frame $G_3$ is interpolated half-way between the fourth and fifth 30 Hz frames $F_1$, $F_5$. The fourth converted frame $G_4$ is interpolated three-quarters of the way between the fifth and sixth 30 Hz frames $F_5$, $F_6$.

Row H of FIG. 6 also shows the six input frames $A_1$ to $A_6$/twelve input fields $a_1$ to $a_{12}$. In this case, certain of the fields are progressive scan converted using motion adaptive intra-field and inter-field interpolation (as described in detail in patent application GB 2231228 A) to produce a series of six full frames $I_1$ to $I_6$, as represented by row I. Specifically, the first to sixth progressive scan converted frames $I_1$ to $I_6$ are produced from the third, fifth, sixth, eighth, tenth and eleventh input fields $a_3$, $a_5$, $a_6$, $a_8$, $a_{10}$, $a_{11}$, respectively, and optionally from the fields immediately preceding and succeeding those fields. The six progressive scan converted frames $I_1$ to $I_6$ are then converted using motion compensated temporal interpolation to produce a series of four 60 Hz, 2:1, to 24 Hz, 1:1 converted frames $J_1$ to $J_4$, as represented by row J. Specifically, the first and third 24 Hz, 1:1 frames $J_1$, $J_3$ are directly produced from the first and fourth progressive scan converted frames $I_1$, $I_4$. However, the second and fourth 24 Hz, 1:1 frames $J_2$, $J_4$ are produced by motion compensated temporal interpolation half-way between the second and third progressive scan converted frames $I_2$, $I_3$, and half-way between the fifth and sixth progressive scan converted frames $I_5$, $I_6$, respectively.

It should be noted from FIG. 6 that the four key frames $D_1$ to $D_4$ of row D ape temporally aligned with respective ones of the four 30 Hz, 1:1 to 24 Hz, 1:1 converted frames $G_1$ to $G_4$ of row G and are also temporally aligned with respective ones of the four 60 Hz, 2:1 to 24 Hz, 1:1 converted frames $J_1$ to $J_4$ of row J.

The output picture signal is produced by selecting either the 30 Hz, 1:1 to 24 Hz, 1:1 converted signal (row G) or the 60 Hz, 2:1 to 24 Hz, 1:1 converted signal (row J) in dependence upon the value, for the pixel under consideration, of the 24 Hz, 1:1 key signal (row D). Specifically, if the key signal is less than a predetermined threshold, the corresponding pixel value of the 30 Hz, 1:1 to 24 Hz, 1:1 signal is selected, whereas if the key signal for that pixel is greater than the threshold, the corresponding pixel value of the 60 Hz, 2:1 to 24 Hz, 1:1 signal is selected.

Figure 7:
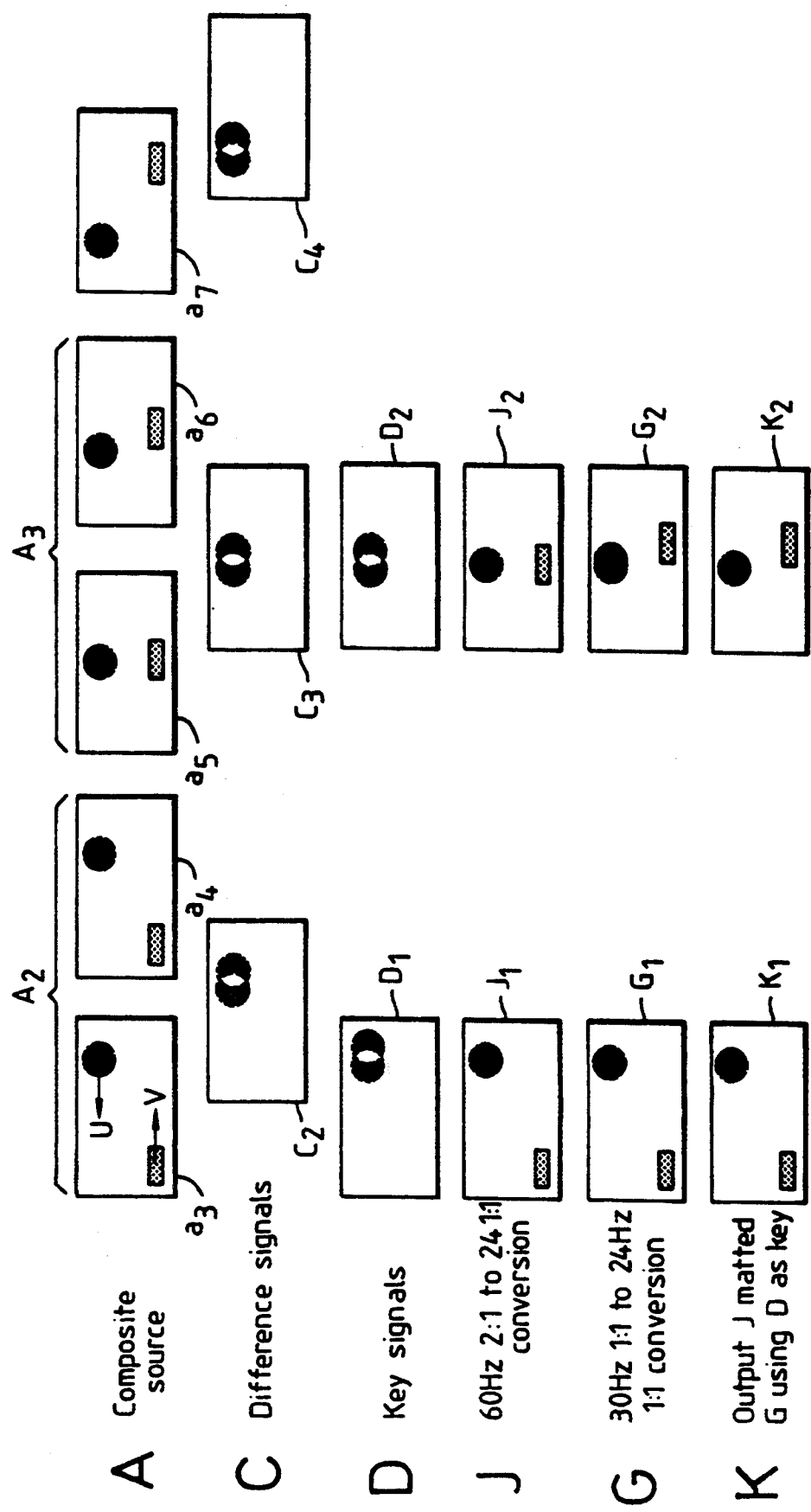
FIG. 7 shows sample pictures in the method of FIG. 6.

An example of how the above-described arrangement may operate is shown in FIG. 7. Row A of FIG. 7 shows five fields $a_3$ to $a_7$ of the input 60 Hz, 2:1 video signal. Towards the top of the picture, a circular object acquired at 60 Hz, 2:1 is moving to the left, whereas towards the bottom of the picture a rectangular object acquired at 30 Hz, 1:1 is moving to the right. The background is static. (For simplicity, FIG. 7 does not attempt to distinguish between the odd and even lines of a frame. ) Because the circular object was acquired at 60 Hz, 2:1, its position appears to move progressively over the five fields $a_3$ to $a_7$ of row A of FIG. 7. However, because the rectangular object was acquired at 30 Hz, 1:1, its position is the same in the first and second fields $a_3$, $a_4$ (the first frame) and its position is the same in the third and fourth fields $a_5$, $a_6$ (the second frame). Row C of FIG. 7 shows the three corresponding difference frames $C_2$ to $C_4$. The only movement between the two fields of a frame is that of the moving circular object, and the difference frames contain the portions of the circular object which are covered or uncovered between fields of a pair. Row D of FIG. 7 shows the corresponding key signal frames $D_1$, $D_2$. Row J of FIG. 7 shows the two corresponding 60 Hz, 2:1 to 24 Hz, 1:1 converted frames $J_1$, $J_2'$ In the second of these two frames $J_2$, the circular object is correctly located, temporally interpolated between its locations in the third and fourth fields $a_5$, $a_6$ of row A. However, the rectangular object is in the wrong position, because its position should have been interpolated between the second and third frames $A_3$, $A_4$ of row A, rather than being derived primarily from its position in the third and fourth fields $a_5$, $a_6$ of row A. Row G of FIG. 7 shows the two corresponding 30 Hz, 1:1 to 24 Hz, 1:1 converted frames $G_1$, $G_2$. In the second of these two frames $G_2$, the rectangular object is correctly located, temporally interpolated between its locations in the second and third frames $A_3$, $A_4$ of row A of FIG. 7. However, the circular object suffers from a loss of vertical resolution and also from double imaging. Row K of FIG. 7 shows the frames of rows J and G matted together in accordance with the key frames of row D. It will be noted that both objects are correctly located and the circular object (acquired at 60 Hz, 2:1) does not suffer from double imaging or any substantial loss of vertical resolution.

An apparatus for performing the method described above with respect to FIGS. 6 and 7 will now be described with reference to FIG. 8. A source digital video tape recorder (DVTR) 44 can supply the input fields to a key signal processor 46, a frame store 48 and a 60 Hz, 2:1 to 24 Hz, 1:1 motion compensated temporal interpolator 50.

The key signal processor 46 includes a vertical interpolator 52 which produces the full frames $B_{even}$ for the even input fields $a_2$, $a_4$, $a_6$, . . . , and a field store 54 and vertical interpolator 56 which produces the full frames $B_{odd}$ for the odd input fields $a_1$, $a_3$, $a_5$, . . . . The even and odd full frames $B_{even}$, $B_{odd}$ are supplied to a subtractor 30 and modulus operator 32 and also to an adder 34, which supply an average intensity corrector 36, operating in the manner described above with reference to FIG. 3 (but on full frames rather than fields) to produce the difference frames C. The differenced frames C can then be supplied to a 30 Hz, 1:1 to 24 Hz, 1:1 motion compensated temporal interpolator 57 as described in further detail with reference to FIG. 70 of patent application 2249907 A, which produces the key frames D which are recorded on a DVTR 56.

The frame store 48 operates to combine the input field pairs $a_1, a_2; a_3, a_4; a_5, a_6; \ldots$ to produce the combined frames F, which can then be supplied to the interpolator 57 to produce the 30 Hz, 1:1 to 24 Hz, 1:1 converted frames G which are recorded on a DVTR 58.

The interpolator 50 is as described with reference to FIGS. 1 to 48 of patent application GB 2231228 A and produces from the input fields a the 60 Hz, 2:1 to 24 Hz, 1:1 converted frames J which are recorded on a DVTR 60.

The DVTR 56 can supply the recorded key frames D via a thresholder 62 to the control input of a multiplexer 64. The thresholder 62 may simply pass the most significant bit of the key frame video signal so that the threshold is set at 128 for 8-bit video data, or alternatively may involve a more complicated thresholding arrangement. The DVTRs 58, 60 can supply the 30 Hz, 1:1 to 24 Hz, 1:1 converted frames G and the 60 Hz, 2:1 to 24 Hz, 1:1 converted frames J in synchronism to the data inputs of the multiplexer 64, and thus the multiplexer 64 produces the matted output frames K which can be recorded on a DVTR 66. The elements of the arrangement of FIG. 8 are controlled by a system controller 68 which supplies various control signals $C_1$ to $C_{10}$.

Figure 8:
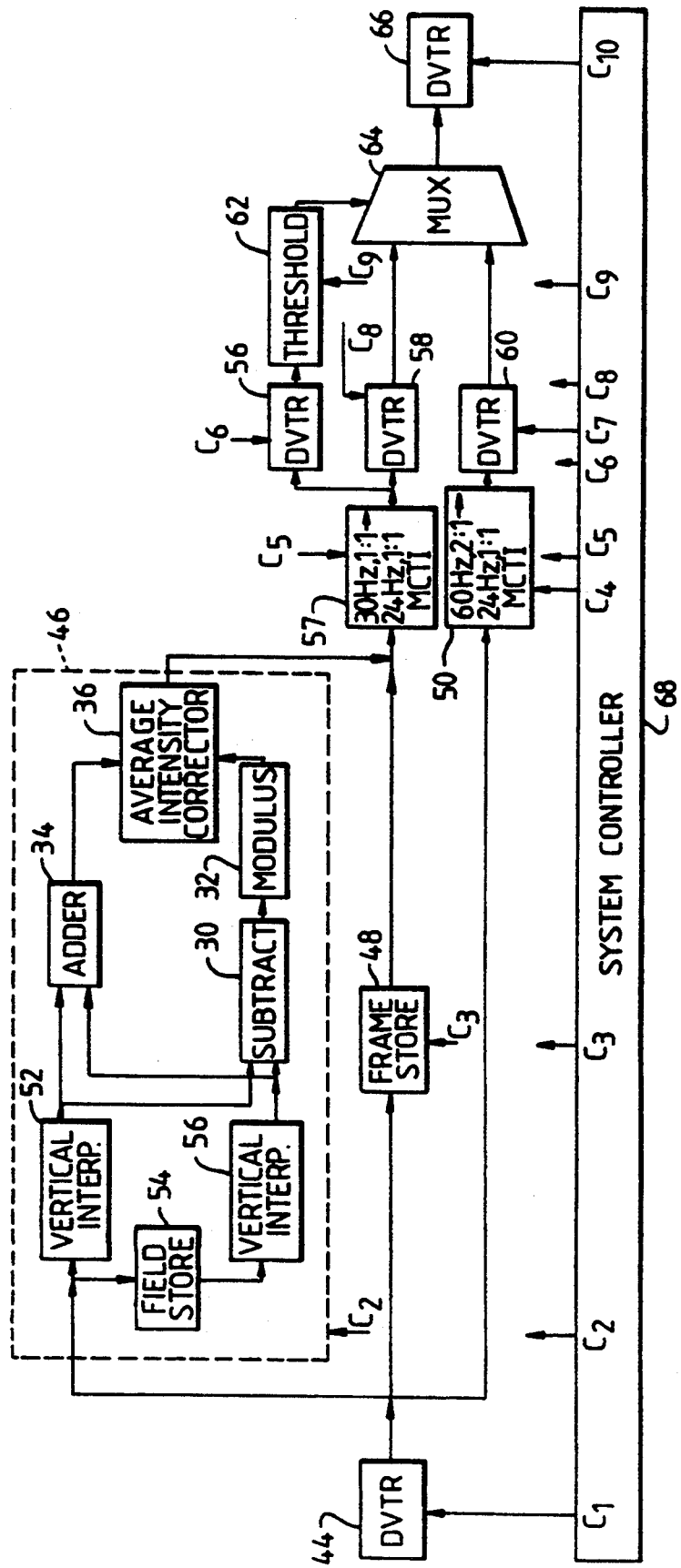
FIG. 8 is a block diagram of an apparatus for performing the method of FIG. 6.

In the example of FIGS. 6 to 8, input video having a composite acquisition of 30 Hz, 1:1 and 60 Hz, 2:1 is processed so as to simulate acquisition at 24 Hz, 1:1. The output frame rate need not be different to the input frame rate. For example, a modified method could be used to convert video having a composite acquisition of 30 Hz 1:1 and 60 Hz, 2:1 so as to simulate acquisition wholly at 30 Hz, 1:1. In order to do this, motion compensated temporal interpolation would be used to generate, for each pair of input fields, a 30 Hz, 1:1 full frame by combining fields, a 30 Hz, 1:1 progressive scan converted frame using motion adaptive intra-field/inter-field interpolation, and a 30 Hz difference frame, all three frames being temporally aligned by the motion compensated temporal interpolation processes.

In the arrangement described with reference to FIGS. 6 to 8, a key signal is generated by forming a difference signal and then converting the key signal by motion compensated temporal interpolation to the required output format. The key signal is then used to matte the two differently converted picture signals. In many cases, the input composite video signal may have been post-produced using a key signal, and in the third example of the invention the key signal used in post-producing the picture signal is used alongside the picture signal. If the format of the key signal is different from the required output format, the key signal is converted to the output format, but apart from that the key signal can be used directly as the input to the multiplexer 64 in an apparatus somewhat like that shown in FIG. 8.

Figure 9:
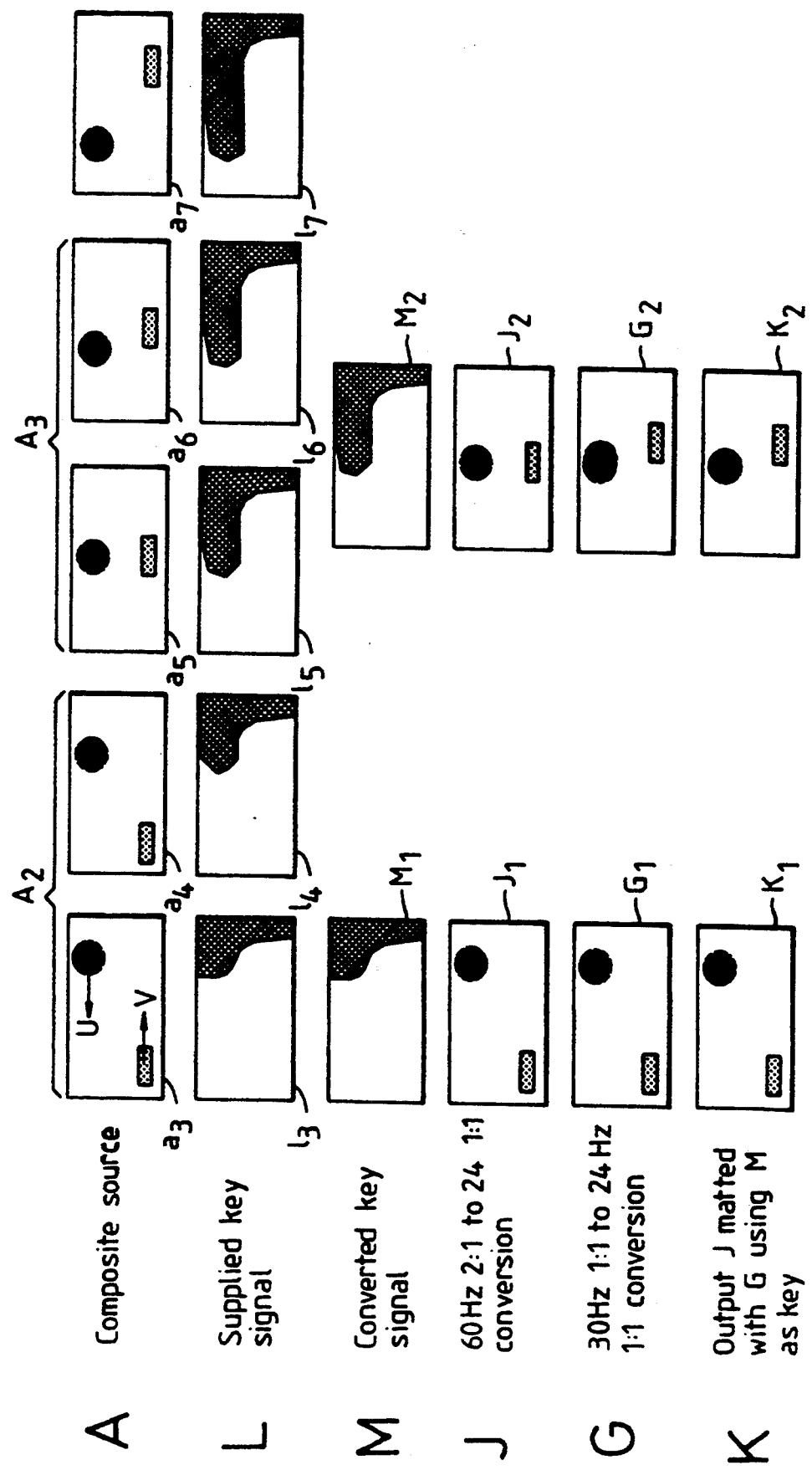
FIG. 9 shows sample pictures in a third example of a method of video signal processing according to the invention.

More specifically, referring to FIG. 9, row A shows a series of 60 Hz, 2:1 input picture frames $A_2$ to $A_4$, or fields $a_3$ to $a_7$, similar to row A of FIG. 7. Row L shows the corresponding key signal fields $1_3$ to $1_7$ supplied with picture fields $a_3$ to $a_7$. In this example, the key signal is 60 Hz, 2:1 rather than 30 Hz, 1:1. In the key fields $1_3$ to $1_7$, the areas shown blank denote the picture area acquired at 30 Hz, 1:1, and the areas which are cross-hatched denote the picture area acquired at 60 Hz, 2:1. The fields of the key signal of row L nearest to the output frame temporal sitings are progressive scan converted to produce a converted key signal as shown by row M of FIG. 9. For example, converted key signal frame $M_1$ is produced by progressive scan conversion based on input key signal field $1_3$, and converted key signal frame $M_2$ is produced by progressive scan conversion based on input key signal field $1_5$. The input picture fields of row A are also 60 Hz, 2:1 to 24 Hz, 1:1 converted and 30 Hz, 1:1 to 24 Hz, 1:1 converted to produce the frames of rows J and G, respectively, in the same way as described above with reference to FIGS. 6 and 7. The frames of row J can therefore suffer from incorrectly placed objects, and the frames of row G can suffer from loss of vertical resolution and double imaging. The frames of rows J and G are then matted using the converted key signal of row M to produce the output frames as shown in row K.

Figure 10:
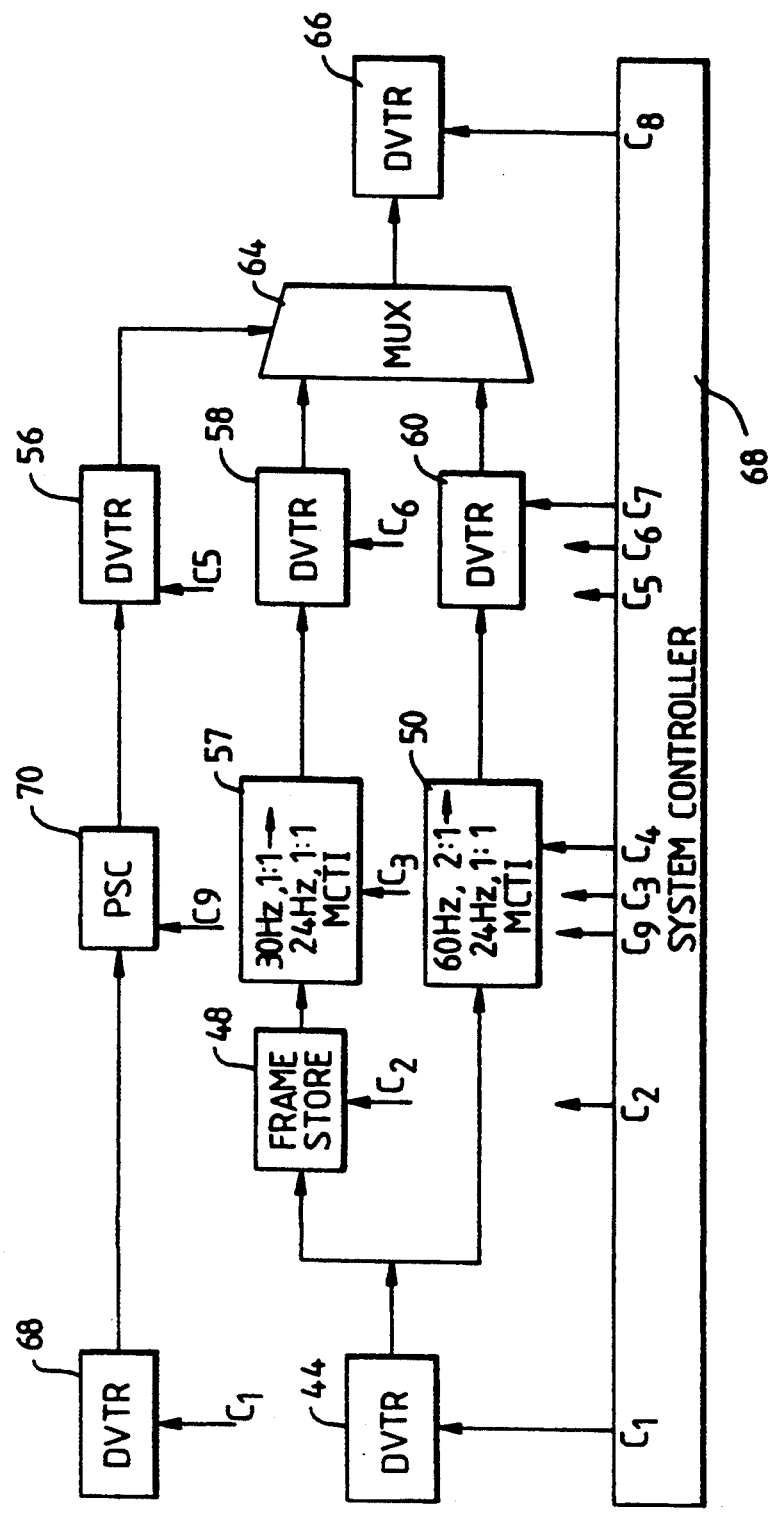
FIG. 10 is a block diagram of an apparatus for performing the method of FIG. 9.

An apparatus for performing the FIG. 9 method will now be described with reference to FIG. 10 in which elements similar to those in FIG. 8 have been denoted by like reference numerals.

The source DVTR 44 can supply the input picture fields a to the frame store 48 which can produce the full 30 Hz, 1:1 picture frames F. The frames can then be converted to 24 Hz, 1:1 by the motion compensated temporal interpolator 57, and the 30 Hz, 1:1 to 24 Hz, 1:1 converted picture frames G can be recorded on the DVTR 58. The source DVTR 44 can also supply the input picture fields a to the interpolator 50 where they can be converted using motion compensated temporal interpolation from 60 Hz, 2:1 to 24 Hz, 1:1, and the converted picture frames J can be recorded on the DVTR 60.

The 60 Hz, 2:1 key signal fields are supplied by a DVTR 68 operating in synchronism with the DVTR 44 to a progressive scan converter 70 as described with reference to FIGS. 5 to 14 of patent application GB 2231228 A, which produces a progressive scan key frame M based on the first and third of every five input fields 1 and these converted key frames M are recorded by the DVTR 56. The three DVTRs 56, 68, 60 then reproduce the converted key frames M and the converted picture frames G, J in synchronism, and the multiplexer 64 selects pixels from the 30 Hz, 1:1 to 24 Hz, 1:1 converted frames G or the 60 Hz, 2:1 to 24 Hz, 1:1 converted frames J in dependence on the converted key signal M to produce the output 24 Hz, 1:1 frees K which can be recorded on the DVTR 66. The system controller 68 produces various control signals $C_1$ to $C_9$ to control the elements of the apparatus.

Figure 11:
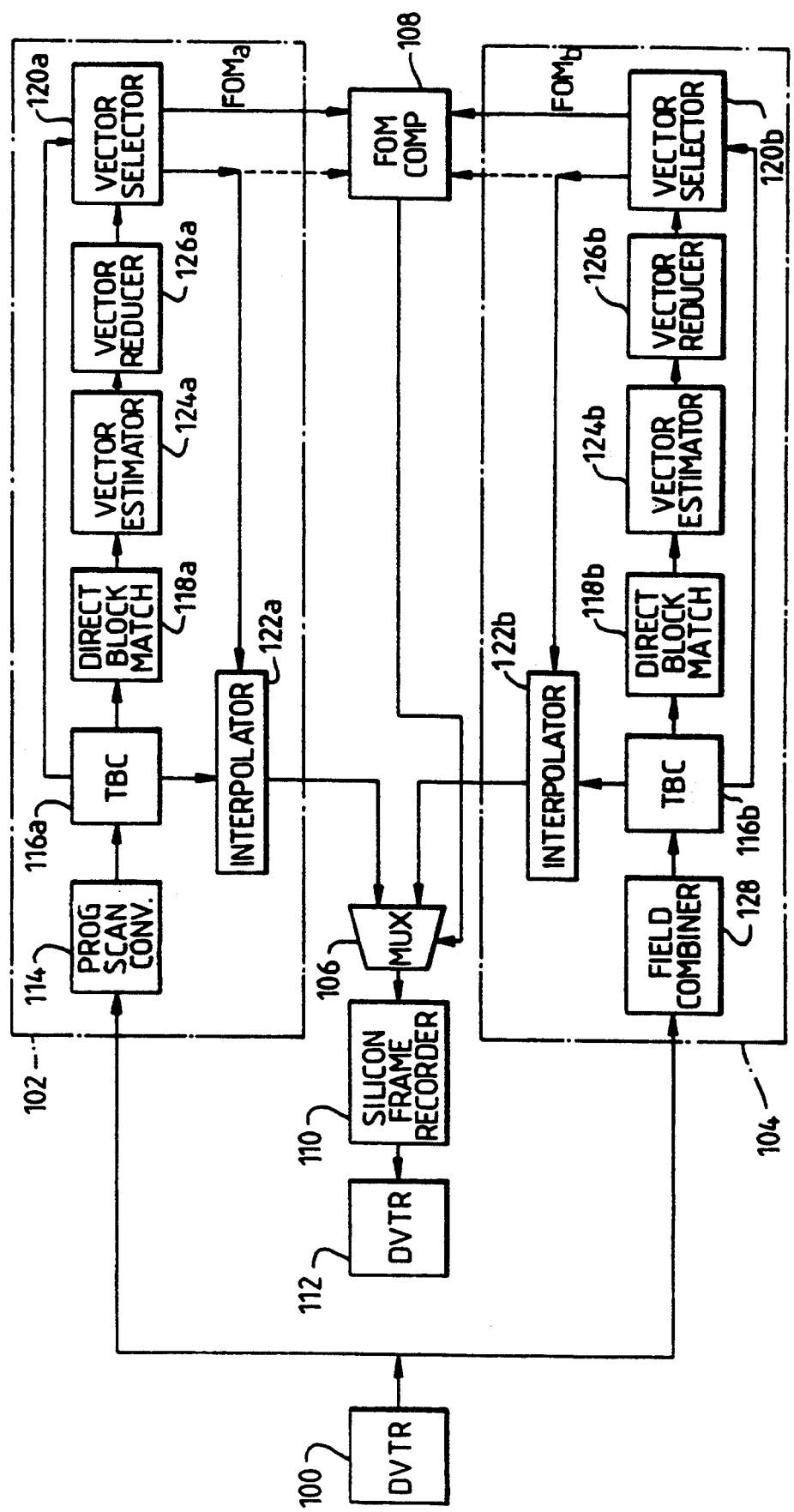
FIG. 11 is a block diagram of an apparatus for performing a fourth example of a method according to the invention.
Figure 12:
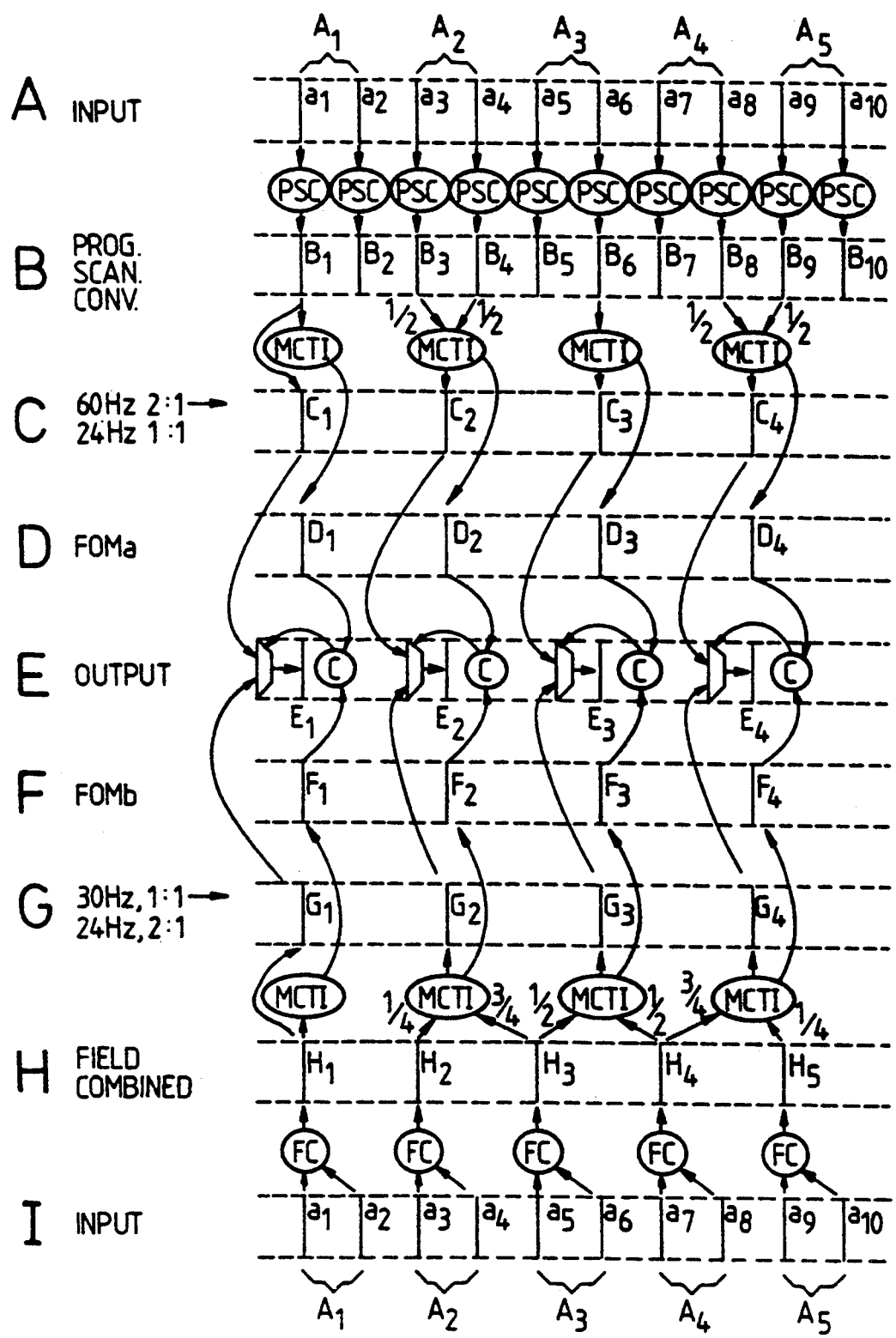
FIG. 12 illustrates further the fourth example of the invention.

FIGS. 11 and 12 illustrate a further embodiment of the invention, which does not require a key signal to be supplied with the source video.

Referring to FIG. 11, the source video signal from a DVTR 100 operating in slow-motion is supplied both to a 60 Hz, 2:1 to 24 Hz, 1:1 motion compensated temporal interpolator 102 substantially as described in GB 2231228A and to a 30 Hz, 2:1 to 24 Hz, 1:1 motion compensated temporal interpolator 104 substantially as described in GB 2249907 A. For each output pixel, the output of the interpolator 102 or of the interpolator 104 is selected by a multiplexer 106 in dependence upon a signal supplied by a figure of merit comparator 108, and the frames output at less than real-time rate from the multiplexer 106 are grouped in a silicon frame recorder 110 before being recorded by an output DVTR 112 operating in burst mode.

More specifically, the 60 Hz, 2:1 to 24 Hz, 1:1 interpolator 102 comprises a progressive scan converter 114, which produces a progressive scan frame from each of the input fields by motion adaptive intra-field and/or inter-field interpolation. The progressive scan frames are supplied to a time base corrector 116a, which in turn supplies the frames at appropriate timings to a direct block matcher 118a, a motion vector selector 120a and an interpolator 122a. As described in detail in GB 2231228A, the direct block marcher 118a produces correlation surfaces, from which a motion vector estimator 124a deduces sets of motion vectors representing estimated motion of sample blocks in the picture and flags indicating how the motion vectors were deduced. The sets of motion vectors and their flags are then processed by a motion vector reducer 126a to produce reduced sets of motion vectors, which are passed to the motion vector selector 120a. The motion vector selector 120a assigns one of the motion vectors of the reduced set to each individual pixel in the sample block. In a first stage, motion vectors are assigned for each pixel in the progressive scan converted frames, and in a second stage, the motion vectors produced in the first stage are used to determine the motion vector for each pixel in the output frame which may be temporally sited partway between a pair of the progressive scan converted frames. As described in detail with reference to FIGS. 36 to 48 of GB 2231228A. various tests are carried out to determine each output frame related motion vector and degrees of match are assessed. In the present embodiment, in addition to producing a motion vector for each output pixel, a figure of merit FOMa is produced for each motion vector dependent upon the results of the tests carried out by the motion vector selector 120a, and the figure of merit values are supplied to the figure of merit comparator 108. As described in GB 2231228A, the interpolator 122a interpolates the value of each output pixel in an output frame temporally sited between a pair of the progressive scan converted frames from the values of the pixels in the progressive scan converted frames offset from the location of the pixel in the output frame by amounts dependent upon the respective motion vector and temporally siting of the output frame.

The 30 Hz, 1:1 to 24 Hz, 1:1 interpolator 104 is similar to the interpolator 102, except that instead of employing a motion adaptive progressive scan converter 114, progressive scan frames are produced by a field combiner 128 which interlaces the fields of each frame of the input video signal. Like the interpolator 102, the interpolator 104 includes a time base corrector 116b, a direct block marcher 118b, motion vector estimator 124b, motion vector reducer 126b, motion vector selector 120b and interpolator 122b operating in the manner described in GB 2231228A and GB 2249907 A, but additionally, like the motion vector sector selector 120a, the motion vector selector 120b also produces for each motion vector a figure of merit FOMb which is supplied to a second input of the figure of merit comparator 108.

In a basic embodiment, the figure of merit comparator 108 compares the figures of merit FOMa, FOMb, and if FOMa≧FOMb it produces a value 1 to cause the multiplexer 106 to select the pixel value from the 60 Hz, 2:1 to 24 Hz, 1:1 interpolator 102, whereas if FOMa<- FOMb it produces a value 0 to cause the multiplexer 106 to select the pixel value from the 30 Hz, 1:1 to 24 Hz, 1:1 interpolator 104.

In a refinement to the basic embodiment, the figure of merit comparator 108 may also use the two motion vectors Va, Vb associated with the figures of merit FOMa, FOMb is deciding which interpolator to select. For example, if both motion vectors are almost identical, it may be preferable to select the 60 Hz, 2:1 to 24 Hz, 2:1 comparator 102, even if the figures of merit suggest otherwise, because noise may have adversely affected the accuracy of the figure of merit FOMa. The operation of the figure of merit comparator 108 may be described as:

$$IF\ (FOMa \geq FOMb)\ OR\ (|Va-Vb|<t)\ THEN$$
$$OUTPUT\ 1,\ ELSE\ OUTPUT\ 0$$

where t is a threshold distance.

Patent application GB 2231228A describes the use of a motion vector post-processor, between the motion vector selector and the interpolator, which compares each motion vector with the motion vectors of surrounding pixels in an attempt to determine any spurious incorrect motion vectors, which may then be modified in dependence upon the surrounding motion vectors. Such motion vector post-processors may be provided in the arrangement of FIG. 11 between the motion vector selectors 120a, 120b and the interpolators 122a, 122b. In this case, the figures of merit FOMa, FOMb may be modified by the motion vector post processors in dependence upon whether or not the respective motion vectors have been determined as likely to be incorrect and whether or not any action has been taken to correct them.

In the case of an object acquired at 30 Hz, 1:1 moving with a velocity V pixels per input frame, the motion vectors produced by the 60 Hz, 2:1 to 24 Hz, 1:1 interpolator for pixels representing that object will be O, V, O, V, ... for successive frames produced by the progressive scan converter. Such a stream of alternating motion vectors is a clear sign that the pixel was acquired at 30 Hz, 1:1. Therefore in a refinement to the embodiment of FIG. 11, the motion vector reducer 126a may be modified to detect such an alternating stream of motion vectors and either suppress them from being passed to the motion vector selector 120a, or alternatively assist the figure of merit selection.

The temporal relationship of fields and frames arising in the arrangement of FIG. 11 will now be described with reference to FIG. 12.

Row A represents a series of five input frames $A_1$ to $A_5$ or ten fields $a_1$ to $a_{10}$ of 60 Hz, 2:1 interlaced material, part of which was acquired at 60 Hz, 2:1 interlace and part of which was acquired at 30 Hz, 1:1. The input fields $a_1$ to $a_{10}$ are each progressive scan converted by the converter 114 of FIG. 11 to produce ten frames $B_1$ to $B_{10}$. A series of four 60 Hz, 2:1 to 24 Hz, 1:1 converted frames $C_1$ to $C_3$ is then produced. The first and third frames $C_1$, $C_3$ may be directly produced from the first and sixth progressive scan converted frames $B_1$, $B_6$. The second and fourth frames $C_2$, $C_4$ are produced by motion compensated temporal interpolation half-way between the third and fourth progressive scan converted frames $B_3$, $B_4$ and half-way between the eighth and ninth progressive scan converted frames $B_8$, $B_9$, respectively, and figure of merit frames $D_2$, $D_4$ are also produced associated with the motion vectors used in producing the frames $C_2$, $C_4$. Although frames $C_1$ and $C_3$ need not be produced by motion compensated temporal interpolation, the interpolator 102 is still employed to produce frames of motion vectors associated with the frames $C_1$, $C_3$ and respective frames of figures of merit $D_1$, $D_3$. (Although, for clarity, the progressive scan converted frames $B_2$; $B_5$; $B_7$; $B_{10}$ are not shown as being employed, it should be noted that they are employed in producing the motion vectors related to frames $B_1$, $B_3$; $B_4$, $B_6$; $B_6$, $B_8$; $B_9$ prior to producing the motion vectors related to frames $C_1$, $C_2$, $C_3$, $C_4$.)

Row I of FIG. 12 also represents the series of five input frames $A_1$ to $A_5$ or ten input frames $a_1$ to $a_{10}$. Pairs of the fields are used by the field combiner 128 of FIG. 11 to produce a series of five field combined frames $H_1$ to $H_5$. A series of four 30 Hz, 1:1 to 24 Hz, 1:1 converted frames $G_1$ to $G_4$ is then produced. The first converted frame $G_1$ may be directly produced from the first field combined frame $H_1$, whereas the second to fourth converted frames $G_2$, $G_3$, $G_4$ are produced by motion compensated temporal interpolation one-quarter, one-half and three-quarters, respectively, of the way between field combined frames $H_2$ and $H_3$, $H_3$ and $H_4$, and $H_4$ and $H_5$, respectively. Figures of merit frames $F_2$ to $F_4$ are produced for each of the converted frames $G_2$ to $G_4$, and a figure of merit frame is also produced for the first frame $G_1$ even though the first frame $G_1$, need not be produced by motion compensated temporal interpolation.

For each pixel location, the figure of merit in the frame $D_i$ and the figure of merit in the corresponding frame $F_i$ are compared by the figure of merit comparator 108, and in dependence on the result (as described above) the value of the corresponding pixel in the corresponding frame $C_i$ or $G_i$ is selected as the value of the corresponding pixel in the corresponding output frame $E_i$ by the multiplexer 106. Thus, a series of four output frames $E_1$ to $E_4$ is produced.

Although the invention has been described with reference to examples in which 60 Hz, 2:1/30 Hz, 1:1 composite material is processed to simulate acquisition wholly at 24 Hz, 1:1, it will be appreciated that modifications may be made to perform other conversions, such as:

| Composite source | Output simulation |
| --- | --- |
| 60 Hz, 2:1/30 Hz, 1:1 | 30 Hz, 1:1 |
| 60 Hz, 2:1/30 Hz, 1:1 | 60 Hz, 2:1 |
| 60 Hz, 2:1/30 Hz, 1:1 | 50 Hz, 2:1 |
| 50 Hz, 2:1/25 Hz, 1:1 | 50 Hz, 2:1 |
| 50 Hz, 2:1/25 Hz, 1:1 | 25 Hz, 1:1 |
| 50 Hz, 2:1/25 Hz, 1:1 | 60 Hz, 2:1 |
| 50 Hz, 2:1/25 Hz, 1:1 | 30 Hz, 1:1 |

It will also be appreciated that many other modifications and developments may be made to the present invention without departing from the spirit and scope of the invention.

What we claim is:

1. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion having a first acquisition characteristic and a second picture portion having a second acquisition characteristic, the method comprising the steps of:
   distinguishing between said first and second picture portions in said input frames; and
   processing said first and second picture portions differently to produce said output frames so that said output frames simulate acquisition of said first and said second picture portions with generally a third acquisition characteristic.

2. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion acquired as progressive scan frames at a first frame rate and having a first acquisition characteristic and a second picture portion acquired as interlaced fields at said first frame rate and having a second acquisition characteristic, the method comprising the steps of:
   detecting picture motion between said fields of the same input frame to distinguish between said first and second picture portions in said input frames; and
   processing said first and second picture portions differently to produce one of said output frames generally by intrafield interpolation of the pixel values of a respective input field in areas of relatively large detected motion and generally by combination of the pixel values of respective input fields in areas of no or relatively small detected motion so that said output frames simulate acquisition of said first and said second picture portions with generally a third acquisition characteristic.

3. A method as claimed in claim 2, wherein said processing step includes combining, for each pixel, the corresponding intra-field interpolated pixel value with the corresponding field-combined pixel value in proportion to a degree of detected motion of that pixel.

4. A method as claimed in claim 2, further comprising the step of further processing said output frames using motion compensated temporal interpolation to simulate acquisition with a different acquisition characteristic.

5. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion acquired as progressive scan frames at a first frame rate and having a first acquisition characteristic and a second picture portion acquired as pairs of interlaced fields at said first frame rate and having a second acquisition characteristic, and said output signal simulates acquisition at said first frame rate, the method comprising the steps of:
   forming a first series of difference frames corresponding to the difference between said fields of each input frame to distinguish between said first and second picture portions in said input frames; and
   processing said first and said second picture portions by forming a series of progressive scan picture frames at least by intrafield interpolation of one field of each frame so that the interpolated picture frames are temporally co-sited with the first picture portions of respective ones of said input frames, producing a second series of difference frames by motion compensated temporal interpolation of said first series of difference frames so that the second difference frames are temporally co-sited with respect to the first picture portions of respective ones of the input frames, and matting said input frames and said interpolated picture frames using said second difference frames as a key signal so that said output frames simulate acquisition of said first and said second picture portions with generally a third acquisition characteristic.

6. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion acquired as progressive scan frames at a first frame rate and having a first acquisition characteristic and a second picture portion acquired as pairs of interlaced fields at said first frame rate and having a second acquisition characteristic, and said output video signal simulating acquisition with a third acquisition characteristic, the method comprising the steps of:

forming a first series of difference frames corresponding to the difference between said fields of each input frame to distinguish between said first and second picture portions in said input frames; and processing said first and said second picture portions by forming a first series of intermediate frames by a motion compensated temporal interpolation process for converting said first picture portions to simulate acquisition with the third acquisition characteristic; forming a second series of intermediate frames by a motion compensated temporal interpolation process for converting said second picture portions to simulate acquisition with said third acquisition characteristic, each said second intermediate frame being temporally co-sited with a respective one of said first intermediate frames; forming a second series of difference frames by motion compensated temporal interpolation for converting said first difference frames to said third acquisition characteristic, each said second difference frame being temporally co-sited with a respective one of said first intermediate frames; and matting said first and said second intermediate frames using said second difference frames as a key signal.

7. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion acquired as progressive scan frames at a first frame rate and having a first acquisition characteristic and a second picture portion acquired as pairs of interlaced fields at said first frame rate and having a second acquisition characteristic, the input signal accompanied by a series of key frames indicating said first and said second picture portions, and said output video signal simulating acquisition with a third different acquisition characteristic, the method comprising the steps of:

detecting said key frames to distinguish between said first and second picture portions in said input frames; and processing said first and said second picture portions by forming a first series of intermediate frames by motion compensated temporal interpolation for converting said first picture portions to simulate acquisition with said third acquisition characteristic, forming a second series of intermediate frames by motion compensated temporal interpolation for converting said second picture portions to simulate acquisition with said third acquisition characteristic, each said second intermediate frame being temporally co-sited with a respective one of said first intermediate frames, forming a second series of key frames by motion compensated temporal interpolation for converting said detected key frames to said third acquisition characteristic, each said second key frame being temporally co-sited with a respective one of said first intermediate frames; and matting said first and said second intermediate frames using said second key frames as a key signal.

8. A method of processing an input digital video signal representing a series of input frames each formed of an array of pixels each having a respective pixel value to produce an output video signal representing a series of output frames each formed of an array of pixels each having a respective pixel value, at least some of the input frames each having a first picture portion having a first acquisition characteristic and a second picture portion having a second acquisition characteristic, the method comprising the steps of:

distinguishing between said first and second picture portions in said input frames; and processing said first and said second picture portions differently to produce said output frames so that said output frames simulate acquisition of said first and said second picture portions with generally a third acquisition characteristic including processing said input frames to simulate a first conversion from said first acquisition characteristic to said third acquisition characteristic using motion compensated temporal interpolation in which motion vectors are developed for said pixels in said input frames, and developing a measure of merit for each said motion vector;

and wherein said distinguishing step is performed in dependence upon said measures of merit.

9. A method as claimed in claim 8, wherein: said processing step further includes:

processing said input frames to simulate a second conversion from said second acquisition characteristic to said output acquisition characteristic using motion compensated temporal interpolation in which motion vectors are developed for said pixels in the picture; and developing a measure of merit for each said motion vector; and said distinguishing step is performed in dependence upon a comparison of said measures of merit of said first and said second conversions.

10. A method as claimed in claim 9, wherein said distinguishing step is performed also in dependence upon a comparison of said motion vectors of said first and said second conversions.

* * * * *